Oct. 8, 1929.  A. E. STEPHENS  1,730,953
FLUID BRAKING SYSTEM
Filed June 6, 1924
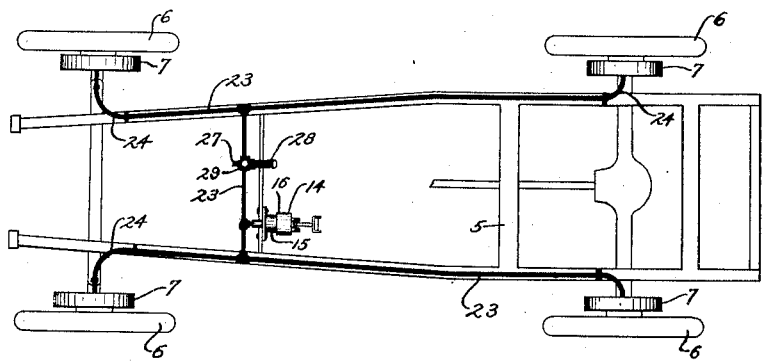
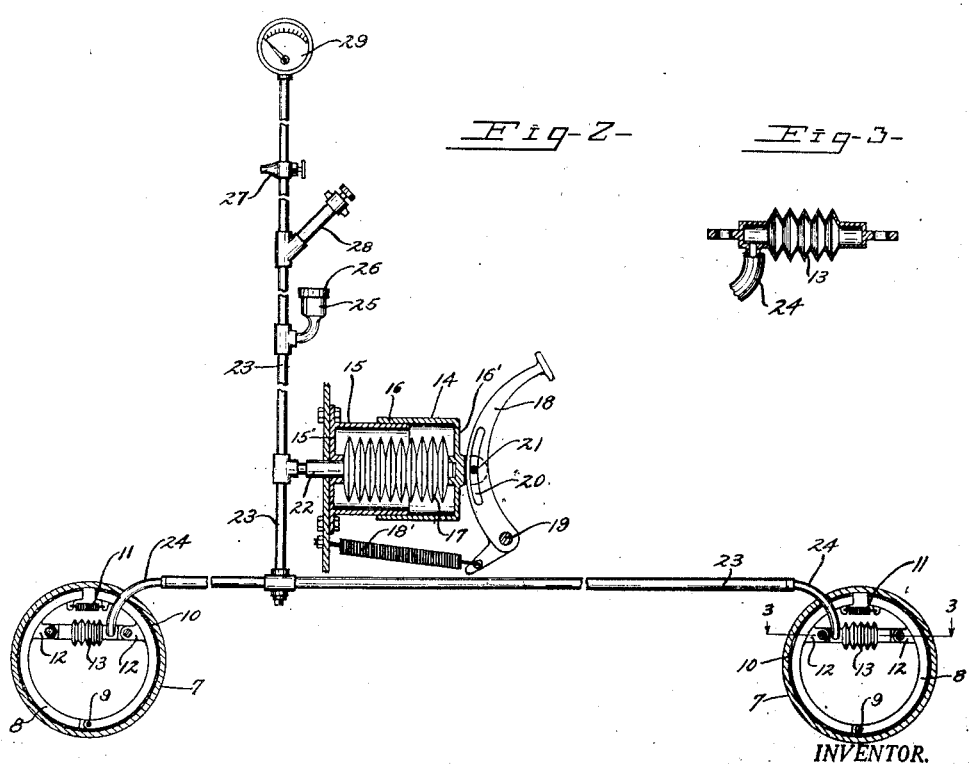
INVENTOR.
Albert E. Stephens.
BY
Morsell, Keeney & Morsell,
ATTORNEYS.

Patented Oct. 8, 1929

1,730,953

UNITED STATES PATENT OFFICE

ALBERT E. STEPHENS, OF MILWAUKEE, WISCONSIN, ASSIGNOR OF ONE-HALF TO BERT CALKINS, OF MILWAUKEE, WISCONSIN

FLUID BRAKING SYSTEM

Application filed June 6, 1924. Serial No. 718,260.

This invention relates to a fluid braking system more particularly adapted for motor vehicles.

It is one of the objects of the present invention to provide a fluid braking system of the closed type in which any of the fluids, either liquid or gaseous or combinations of the two, may be used as the medium for transmitting the braking power to the braking elements.

A further object of the invention is to provide a fluid braking system in which the initial pressure may be regulated to take up and adjust brake band wear and also to adjust the maximum pressure in the system.

A further object of the invention is to provide a fluid braking system having means for increasing or decreasing the pressure in the system.

A further object of the invention is to provide a fluid braking mechanism which is adapted for use with both the front and rear axles of a motor vehicle, whereby the stress and strains on the vehicle are more evenly distributed as the vehicle is brought under control or stopped.

A further object of the invention is to provide a fluid braking system in which the possibility of the pressure medium freezing in cold weather is eliminated.

A further object of the invention is to provide a fluid braking system in which the parts may be operated with the minimum effort by the driver in a very simple manner.

A further object of the invention is to provide a fluid braking system which will have a cushioning effect upon the brake drums and bands to permit a more smooth application of the brakes.

A further object of the invention is to provide a fluid braking system which is of simple construction, is strong and durable, and is well adapted for the purpose described.

With the above and other objects in view, the invention consists of the improved fluid braking system and its parts and combinations as set forth in the claims, and all equivalents thereof.

In the accompanying drawing in which the same reference characters indicate the same parts in all of the views:

Fig. 1 is a top diagrammatic view of a motor vehicle frame provided with the improved fluid braking system;

Fig. 2 is a vertical side view of the working parts of the mechanism, parts being shown in section; and Fig. 3 is a horizontal sectional detail view taken on line 3—3 of Fig. 2.

Referring to the drawing, the numeral 5 indicates a motor vehicle frame, 6 the wheels thereof and 7 the brake drums mounted on the wheels. The brake drums are preferably mounted on each wheel and each drum is provided with a two-part brake band 8. The two parts of the band are hinged together as indicated by the numeral 9 and the periphery of each complete band is covered by a brake lining 10 which is adapted to frictionally engage the inner periphery of the drum when the band is in expanded position. A coiled spring 11 connected to the free end portions of the band parts normally holds said parts in the "off" or non-braking position. Each half part of the brake band adjacent the free end part, is formed with an eyed lug 12, and interposed between the eyed lugs and pivotally connected thereto is an expansible member 13. Said expansible member is preferably of tubular corrugated form to expand lengthwise under pressure so that when expanded the half portions of the brake band and the lining will be firmly forced against the inner periphery of the brake drum and retard the rotation thereof.

An actuating member 14 located in a convenient position to be engaged by the operator comprises tubular telescopic members 15 and 16 having closed end portions 15' and 16' between which an expansible member 17 is positioned. This expansible member is similar to the member 13 but is of larger capacity and at one end is connected to the end portion 15' and at its other end is connected to the end portion 16'. A foot lever 18 fulcrumed to a support by a pivot pin 19 is provided with a curved slot 20 through which extends a pin 21 connected to the end portion 16' so that when the foot pedal is pushed forwardly and downwardly, the fluid, liquid or gaseous, or both, within the expansible member will be put under increased pressure. A coiled spring 18' connected to the lower end portion of the foot lever and to the frame of the vehicle normally holds the foot lever in its inoperative position. A tube 22 connected to the expansible member extends outwardly through the actuating member 14 and is connected to a tubular member and its branches 23 which may lead to any point on the motor vehicle frame. Flexible tubes 24 connect the ends of the tubes 23 to the respective expansible members 13. A filling opening 25 closed by a cover 26 is provided for supplying additional fluid to the system, and an escape valve 27 is also provided for discharging excess fluid in the system.

To maintain the proper pressure, a pump 28 is connected to the tubes and an indicator 29 shows the amount of pressure in the system. As the system is a closed one, there can be no loss of the transmission fluid and a fluid can be used which will not freeze in cold weather.

In operation, the tubes and the expansible members are filled with a fluid, oil or oil and air for instance, and the fluid is put under a pressure sufficient to almost overcome the tension of the springs 11 so that when the expansible member 17 is forced inwardly by the foot lever, an additional pressure on the oil will be created and this pressure will be transmitted by the oil to the expansible members 13 within the brake drums and expand said members 13 and force the braking bands into braking engagement with the drums. In using air and oil under pressure, the air serves to cushion the application of the brakes and permits easy engagement of the parts. As thus operated, the starting of the pressure on the drums will be very easy and the brakes will be applied gently but positively and thereby conduce to the long wear of the parts. Furthermore, the construction provides for any degree of pressure of gaseous fluid on the liquid fluid desired and also a construction in which the transmitted pressure against all of the drums is equalized.

From the foregoing description it will be seen that the fluid braking system is of very simple construction, and is well adapted for the purpose described.

What I claim as my invention is:

1. A fluid braking system, comprising brake elements, air and liquid holding responsive devices for actuating the brake elements, a manually actuated element having air and liquid connections with the air and liquid responsive devices for yieldingly operating the same, and manually actuated means for directly increasing or diminishing the pressure of the air on the liquid.

2. A fluid braking system, comprising brake elements, air and liquid holding responsive devices for actuating the brake elements, a manually actuated element having air and liquid connections with the air and liquid responsive devices for yieldingly moving the parts to braking position, yielding means for moving the parts to non-braking position, and manually actuating means for directly increasing or diminishing the pressure of the air on the liquid.

3. A fluid braking system, comprising brake elements, air and liquid holding responsive devices for actuating the brake elements, a manually actuated element having air and liquid connections with the air and liquid responsive devices for yieldingly moving the parts to braking position, yielding means for normally maintaining the parts in non-braking position, and manually actuating means for directly increasing or diminishing the normal pressure of the air on the liquid.

4. A fluid braking system, comprising brake drums, brake elements therefor, air and liquid holding pressure responsive devices for actuating the brake elements, a manually actuated element having air and liquid connections with the responsive devices for yieldingly increasing and transmitting the increased pressure to said responsive devices, yielding means for normally maintaining the parts in non-braking position, and manually actuated means for increasing or diminishing the normal pressure of the air on the liquid.

5. A fluid braking system, comprising brake drums, brake bands therefor, air and liquid holding expansible devices for actuating the brake bands, a compressible element having air and liquid connections with the expansible devices for yieldingly increasing and transmitting the increased pressure to said expansible devices, yielding means for normally maintaining the parts in non-braking position, and manually actuated means controlling the normal pressure of the air on the liquid.

6. A fluid braking system, comprising brake drums, brake bands therefor, air and liquid holding corrugated tubular expansible devices for actuating the brake bands, a compressible element having air and liquid connections with the expansible devices for yieldingly increasing and transmitting the increased pressure to said expansible devices, yielding means for normally maintaining the parts in non-braking position, and manually actuated means controlling the normal pressure of the air on the liquid.

7. A fluid braking system, comprising brake drums, two part hinged-together brake bands positioned within the drums, a liquid holding corrugated tubular expansible device interposed between the two parts of each brake band and connected thereto, a corrugated tubular compressible member for holding air and liquid and having a tubular connection with the expansible devices, enclosing means for the compressible member, a foot lever connected to the compressible member for increasing or diminishing the pressure of the air in the compressible member, means for holding the foot lever in its normal off position, yielding means for holding the brake bands in non-braking position, air means manually compressed for yieldingly increasing the normal pressure on the liquid in the system, and manually actuated means for decreasing the pressure in the system.

In testimony whereof, I affix my signature.

ALBERT E. STEPHENS.